(12) United States Patent
Rodriguez

(10) Patent No.: US 8,104,223 B1
(45) Date of Patent: Jan. 31, 2012

(54) INSECT CAPTURING APPARATUS

(76) Inventor: John Rodriguez, Yonkers, NY (US)

( * ) Notice: Subject to any disclaimer, the term of this patent is extended or adjusted under 35 U.S.C. 154(b) by 30 days.

(21) Appl. No.: 12/781,505

(22) Filed: May 17, 2010

Related U.S. Application Data

(60) Provisional application No. 61/216,142, filed on May 15, 2009.

(51) Int. Cl.
*A01M 1/14* (2006.01)
(52) U.S. Cl. .............................. 43/115; 43/114
(58) Field of Classification Search ............. 43/114–116
See application file for complete search history.

(56) References Cited

U.S. PATENT DOCUMENTS

| | | | | |
|---|---|---|---|---|
| RE11,000 E | * | 4/1889 | Thum | 43/115 |
| 617,243 A | * | 1/1899 | Fernald et al. | 43/115 |
| 638,438 A | * | 12/1899 | Boone | 43/115 |
| 734,636 A | * | 7/1903 | Truslow | 43/115 |
| 783,211 A | * | 2/1905 | Maddux | 43/115 |
| 790,876 A | * | 5/1905 | Andrus | 43/121 |
| 800,354 A | * | 9/1905 | Boyd | 43/114 |
| 825,660 A | * | 7/1906 | Klousnitzer | 43/116 |
| 827,006 A | * | 7/1906 | Gathmann et al. | 43/115 |
| 835,239 A | * | 11/1906 | Epple | 43/116 |
| 906,867 A | * | 12/1908 | Forker | 43/115 |
| 1,118,845 A | * | 11/1914 | Day | 43/114 |
| 1,132,007 A | * | 3/1915 | Hart | 43/115 |
| 1,159,718 A | * | 11/1915 | Semendinger | 43/115 |
| 1,451,583 A | * | 4/1923 | McCardia | 43/115 |
| 1,511,682 A | * | 10/1924 | Skelly | 43/114 |
| 1,802,774 A | * | 4/1931 | Nixon | 43/115 |
| 1,972,762 A | * | 9/1934 | Drummond | 43/115 |
| 2,962,836 A | * | 12/1960 | Hughes | 43/114 |
| 3,449,856 A | * | 6/1969 | Weaver | 43/115 |
| 3,864,866 A | * | 2/1975 | Kosinsky | 43/114 |
| 4,161,079 A | * | 7/1979 | Hill | 43/114 |
| 4,208,828 A | * | 6/1980 | Hall et al. | 43/114 |
| 4,244,134 A | * | 1/1981 | Otterson | 43/114 |
| 4,349,981 A | * | 9/1982 | Sherman | 43/114 |
| 4,395,842 A | * | 8/1983 | Margulies | 43/114 |
| 4,425,731 A | * | 1/1984 | Orlando | 43/114 |
| 4,425,733 A | * | 1/1984 | Ammon et al. | 43/115 |
| 4,577,434 A | * | 3/1986 | Davis | 43/115 |
| 4,685,244 A | * | 8/1987 | Marks | 43/114 |
| 4,709,503 A | * | 12/1987 | McQueen | 43/114 |
| 4,709,504 A | * | 12/1987 | Andric | 43/114 |
| 4,815,231 A | * | 3/1989 | McQueen | 43/114 |
| 5,022,180 A | * | 6/1991 | Albanese | 43/114 |

(Continued)

FOREIGN PATENT DOCUMENTS

EP 1767089 A1 * 3/2007

(Continued)

*Primary Examiner* — Darren W Ark
(74) *Attorney, Agent, or Firm* — Montgomery Patent & Design, LLC; Robert C. Montgomery; Joseph T. Yaksich

(57) ABSTRACT

An apparatus designed to catch flies and other flying insects comprises an aesthetically pleasing rectangular housing with a top opening which allows an insect to fly or crawl onto an internal tacky sheet to be trapped. The housing may be placed upon any flat surface or be wall-mounted, thereby minimizing an occurrence of observing the trapped dead insects. A side surface of the housing provides loading and unloading of a slide-in tacky sheet. The tacky sheet attracts and traps flying or crawling insects such as flies through the top opening of the housing, thereby partially blocking a view of the trapped insects inside.

16 Claims, 6 Drawing Sheets

U.S. PATENT DOCUMENTS

| | | | | |
|---|---|---|---|---|
| 5,325,625 A | * | 7/1994 | Liu et al. | 43/114 |
| 5,383,301 A | * | 1/1995 | Babb | 43/114 |
| 5,384,981 A | * | 1/1995 | Cohen | 43/114 |
| 5,572,825 A | * | 11/1996 | Gehret | 43/114 |
| 5,577,342 A | * | 11/1996 | Johnson et al. | 43/114 |
| 5,588,250 A | * | 12/1996 | Chiba et al. | 43/114 |
| 5,713,153 A | * | 2/1998 | Cook et al. | 43/114 |
| 5,950,353 A | * | 9/1999 | Johnson et al. | 43/114 |
| 6,047,494 A | * | 4/2000 | Johnson et al. | 43/114 |
| 6,178,687 B1 | * | 1/2001 | Frisch | 43/114 |
| 6,185,862 B1 | * | 2/2001 | Nelson | 43/136 |
| 6,202,339 B1 | * | 3/2001 | Knuppel | 43/114 |
| 6,438,894 B1 | * | 8/2002 | Silvandersson et al. | 43/114 |
| 6,442,889 B1 | * | 9/2002 | Lee | 43/114 |
| 6,886,292 B2 | * | 5/2005 | Studer et al. | 43/114 |
| 7,676,986 B2 | * | 3/2010 | Nelson | 43/114 |
| 7,748,159 B1 | * | 7/2010 | Wenner | 43/115 |
| 7,856,752 B1 | * | 12/2010 | Eilersen | 43/115 |
| 2005/0274058 A1 | * | 12/2005 | Miller | 43/114 |
| 2009/0158636 A1 | * | 6/2009 | Rosario | 43/114 |
| 2009/0183419 A1 | * | 7/2009 | Harris | 43/114 |

FOREIGN PATENT DOCUMENTS

| | | | |
|---|---|---|---|
| JP | 52043671 A | * | 4/1977 |
| JP | 10108607 A | * | 4/1998 |
| JP | 11187796 A | * | 7/1999 |
| JP | 2000350546 A | * | 12/2000 |
| JP | 2001211805 A | * | 8/2001 |
| JP | 2001333682 A | * | 12/2001 |
| JP | 2002253101 A | * | 9/2002 |
| JP | 2003189780 A | * | 7/2003 |
| JP | 2003230348 A | * | 8/2003 |
| JP | 2006296392 A | * | 11/2006 |
| JP | 2008022730 A | * | 2/2008 |
| JP | 2008237071 A | * | 10/2008 |
| JP | 2009153513 A | * | 7/2009 |
| JP | 2011024450 A | * | 2/2011 |

* cited by examiner

INSECT CAPTURING APPARATUS

RELATED APPLICATIONS

The present invention was first described in and claims the benefit of U.S. Provisional Application No. 61/216,142 filed May 15, 2009, the entire disclosures of which are incorporated herein by reference.

FIELD OF THE INVENTION

The present invention relates generally to insect traps, and in particular, to a device particularly adapted for the aesthetic trapping of flying insects.

BACKGROUND OF THE INVENTION

Flies, gnats, and other flying insects are persistent problems in almost all areas of the world. Such insects are viewed as particularly undesirable in settings where their presence may be a health concern, such as in the food industry. In order to control such pests, people have resorted to various methods to eradicate them, such as chemicals and poison. One (1) other common method, especially in indoor environments is that of flypaper strips. Such strips are usually hung from the ceiling where they attract insects to its sticky surface where they remain until death.

One (1) unfortunate side effect of flypaper's efficiency is that the room occupants are forced to view multiple dead insects. Ironically, the better the flypaper works, the worse the sight becomes. Frequent replacement only drives up costs and the first insect captured becomes an aesthetically displeasing sight. In commercial settings, such devices are detrimental to the image of a business and may negatively impact profit.

Various attempts have been made to provide fly paper style insect traps. Examples of these attempts can be seen by reference to several U.S. patents. U.S. Pat. No. 827,006, issued in the name of Gathmann et al., describes a fly paper guard and holder which allow a user to easily store, set up and handle the flypaper traps without contacting the flypaper surface.

U.S. Pat. No. 5,383,301, issued in the name of Babb, describes a decorative insect trap with flypaper portions which form an image such as a butterfly or the like.

U.S. Pat. No. 4,577,434, issued in the name of Davis, describes a flypaper trap comprising an apertured cylindrical outer protective shield which houses a replaceable flypaper portion.

While these devices fulfill their respective, particular objectives, each of these references suffer from one (1) or more of the aforementioned disadvantages. Many such devices are unsightly during use, limited their utility in settings where an aesthetic appearance must be maintained. Also, many such devices do not provide simple reuse capabilities which do not require disposal or reinstallation of the system. Furthermore, many such devices do not provide a means for attachment in a variety of desirable locations within a building or the like. Accordingly, there exists a need for a flying insect trap without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a means to provide a flying insect trap which provides enhanced aesthetics via permanent or semi-permanent fixture within a building while providing for easy disposal and replacement. Thus, the object of the present invention is to solve the aforementioned disadvantages and provide for this need.

To achieve the above objectives, it is an object of the present invention to provide a means for trapping and concealing flies and other insects in an indoor environment. The apparatus comprises a housing portion with a top access opening allowing an insect to enter the apparatus and contact a tacky substrate assembly.

Another object of the present invention is to provide an aesthetic appearance while providing for the extermination of insects.

Yet still another object of the present invention is to allow a user to easily determine when the apparatus has reached a maximum capacity of captured insects by visual inspection through the top access opening.

Yet still another object of the present invention is to provide a replaceable laminated substrate assembly for trapping insects. Each substrate assembly comprises a base layer, first and second adhesive layers, a paper layer, and a lanyard.

Yet still another object of the present invention is to provide a means to easily load and unload a substrate assembly into the apparatus. The apparatus comprises a side access opening further comprising a pair of horizontal opposing slot portions arranged in a parallel manner to slidingly receive the flat rectangular substrate assembly.

Yet still another object of the present invention is to allow a user to easily and sanitarily remove a substrate assembly from the side access opening. This is accomplished via the lanyard which provides a means for a user to pull and carry the substrate assembly without contacting exterminated insects.

Yet still another object of the present invention is to provide various mounting means for use in an indoor environment.

Yet still another object of the present invention is to provide for mounting to a vertical wall surface or the like via a plurality of fastening devices affixed to bottom corner portions of a base portion of the apparatus.

Yet still another object of the present invention is to provide a packaging and storage means for a plurality of replacement substrate assemblies. This is accomplished via a refill box with a plurality of vertical parallel box slots similar to the substrate slot portions, allowing a user to separately load and unload a plurality of substrate assemblies.

Yet still another object of the present invention is to provide a method of utilizing the device that provides a unique means of choosing an apparatus with a desired outer aesthetic appearance, mounting the apparatus in a desired location to minimize negative aesthetic effects from contained insects, inserting a substrate assembly, allowing insects to enter through the top opening of the apparatus and become trapped in a conventional manner, easily and sanitarily removing and disposing of a spent substrate assembly via the side opening, and obtaining and easily replacing the substrate assembly for continued use.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
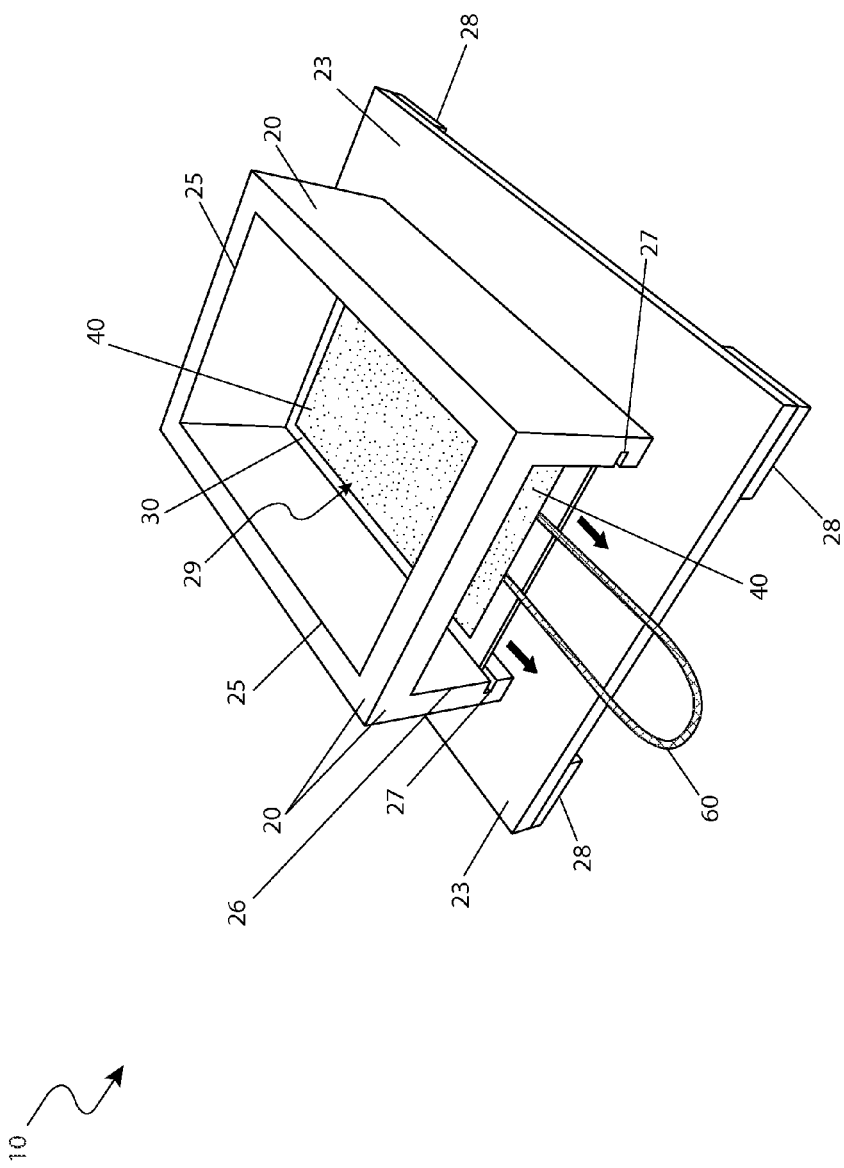
FIG. 1 is a front perspective view of the insect capturing apparatus 10, according to a preferred embodiment of the present invention.

DESCRIPTIVE KEY 10 insect capturing apparatus
20 housing portion
23 base portion
25 top access opening
26 side access opening
27 substrate slot
28 fastening device
29 substrate assembly
30 base layer
40 first adhesive layer
45 second adhesive layer
50 paper layer
60 lanyard
65 foot
70 insect
100 furniture surface
110 wall surface
120 refill box
122 box body
124 box lid
126 box slot

DETAILED DESCRIPTION OF THE PREFERRED EMBODIMENT

The best mode for carrying out the invention is presented in terms of its preferred embodiment, herein depicted within FIGS. 1 through 6. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an insect capturing apparatus (herein described as the "apparatus") 10, which provides a means for trapping and concealing flies and other insects 70 in residential, commercial, or other indoor environments. The apparatus 10 comprises a housing portion 20 further comprising a top access opening 25 allowing an insect 70 to enter the apparatus 10 and contact an extremely tacky substrate assembly 29. Said apparatus 10 is utilized as an alternative to conventional flypapers which are accompanied with an unpleasant visual distraction of exterminated insects 70. Said apparatus 10 provides extermination of an insect 70 infestation while providing an aesthetic appearance within a user's domicile.

Figure 2:
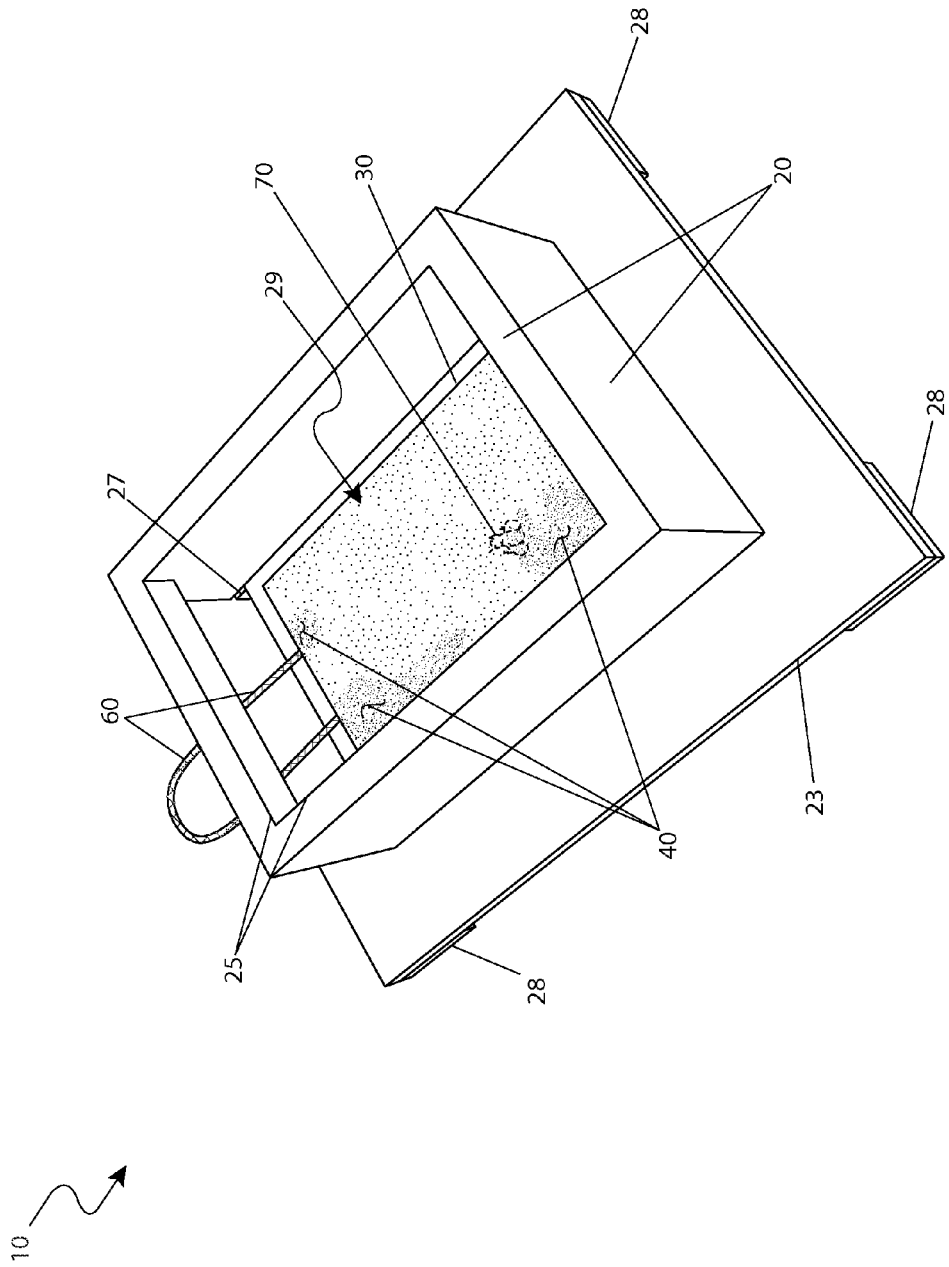
FIG. 2 is a side perspective view of the insect capturing apparatus 10, according to a preferred embodiment of the present invention.

Referring now to FIGS. 1 and 2, perspective views of the apparatus 10, according to the preferred embodiment of the present invention, are disclosed. The apparatus 10 takes the form of a rectangular housing portion 20 having a rectangular access opening 25 along a top surface, thereby allowing insects 70 to fly inside of the apparatus 10 and become attached to the substrate assembly 29 (see FIGS. 4 and 5). The top access opening 25 also allows a user a visual means to easily determine when the apparatus 10 has reached a maximum capacity of captured insects 70. The housing 20 is envisioned to have dimensions of approximately two (2) inches in height, two (2) inches in width, and three (3) inches in length; however, actual dimensions of the housing 20 are envisioned to be introduced in an assortment of sizes which correspond to a variety of different types of insect infestations. The housing 20 provides an attachment means to a base portion 23 affixed thereto a bottom surface of said housing 20 using common fasteners such as screws, nails, adhesives, or the like. Said base portion 23 extends horizontally outward from the housing 20 along all four (4) sides approximately one (1) inch to form a stable base platform. The housing 20 and base 23 portions are envisioned to be fabricated from a variety of materials such as, but not limited to: plastic, wood, compressed fiberboard, or the like. Furthermore, the housing 20 and base 23 portions are envisioned to be introduced having a variety of attractive colors and patterns to match an existing décor.

The housing 20 also comprises a rectangular side access opening 26, thereby providing loading and unloading of the substrate assembly 29. Said side access opening 26 comprises a pair of opposing substrate slot portions 27 which extend longitudinally along internal long sides of the housing 20. Said substrate slots 27 are arranged in a parallel manner being sized to slidingly receive the flat rectangular substrate assembly 29, thereby providing a means to easily load and unload said substrate assembly 29 into the apparatus 10. Said substrate assembly 29 comprises an upward facing tacky first adhesive layer 40 providing an essential method of trapping insects 70 (see FIGS. 4 and 5). Packaging of a plurality of substrate assemblies 29 is provided within a convenient refill box 120 allowing easy removal of a spent substrate assembly 29 and insertion of a new substrate assembly 29, thereby renewing the apparatus 10 (see FIG. 6).

Figure 3:
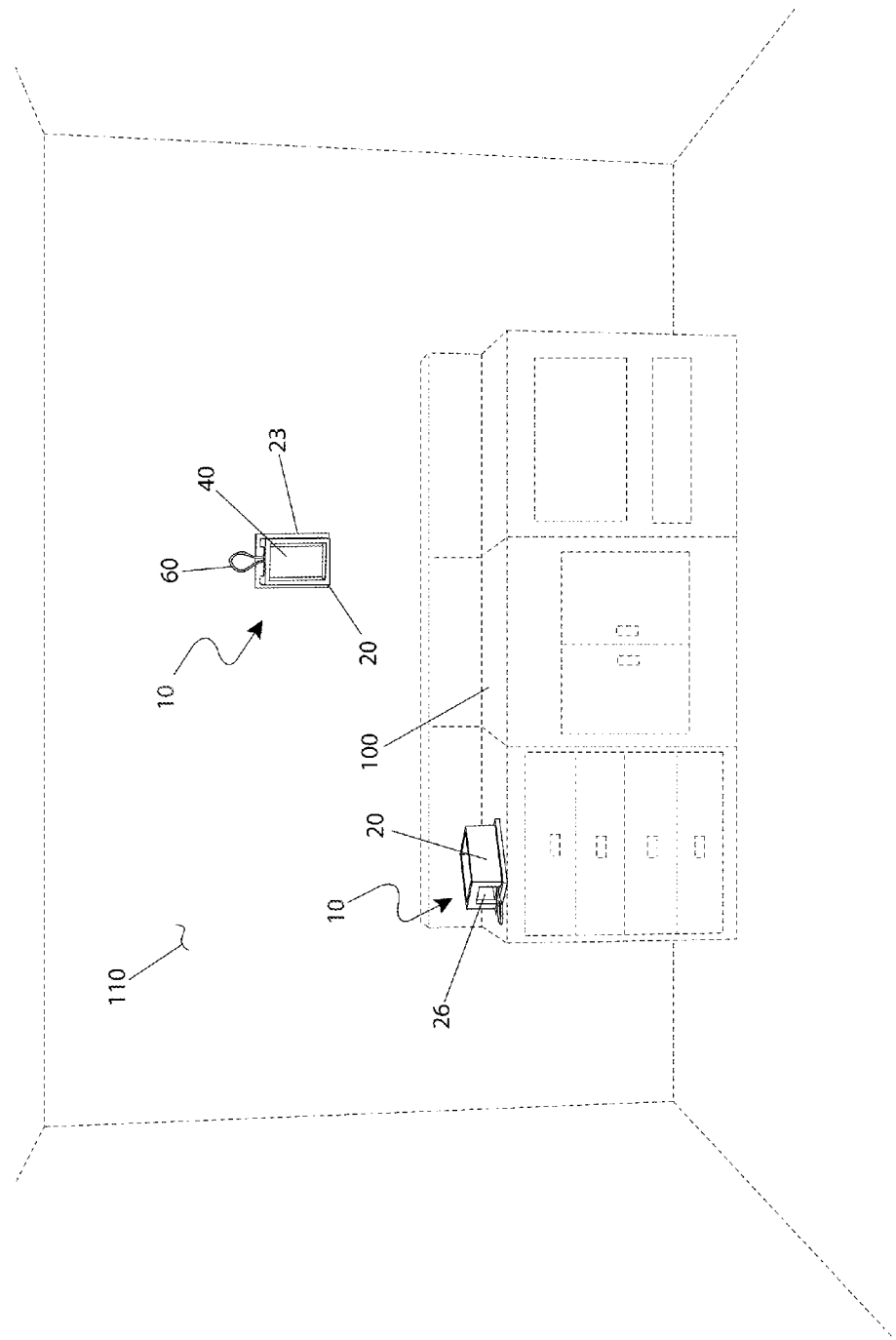
FIG. 3 is an environmental view of an insect capturing apparatus 10 depicting placement therein a structure, according to a preferred embodiment of the present invention.

Referring now to FIG. 3, an environmental view of the apparatus 10, according to the preferred embodiment of the present invention, is disclosed. The apparatus 10 is shown here being positioned in a kitchen setting; however, it is understood that the apparatus 10 may be placed in a variety of settings where needed such as, but not limited to: a bathroom, a bedroom, a garage, or the like. Said apparatus 10 is also capable of being mounted therein a variety of user specified manners throughout an indoor environment. The apparatus 10 may be set on a counter or other horizontal furniture surface 100 and may also be fastened to a wall surface 110 or other vertical surface using four (4) fastening devices 28 affixed to bottom corner portions of the base portion 23. Said fastening devices 28 may comprise attachment means such as, but not limited to: adhesive-backed foam pads, hook-and-loop strips, or the like. Additionally, said fastening devices 28 may also act as coasters to reduce scratching when the apparatus 10 is placed upon a flat furniture surface 100.

Figure 4:
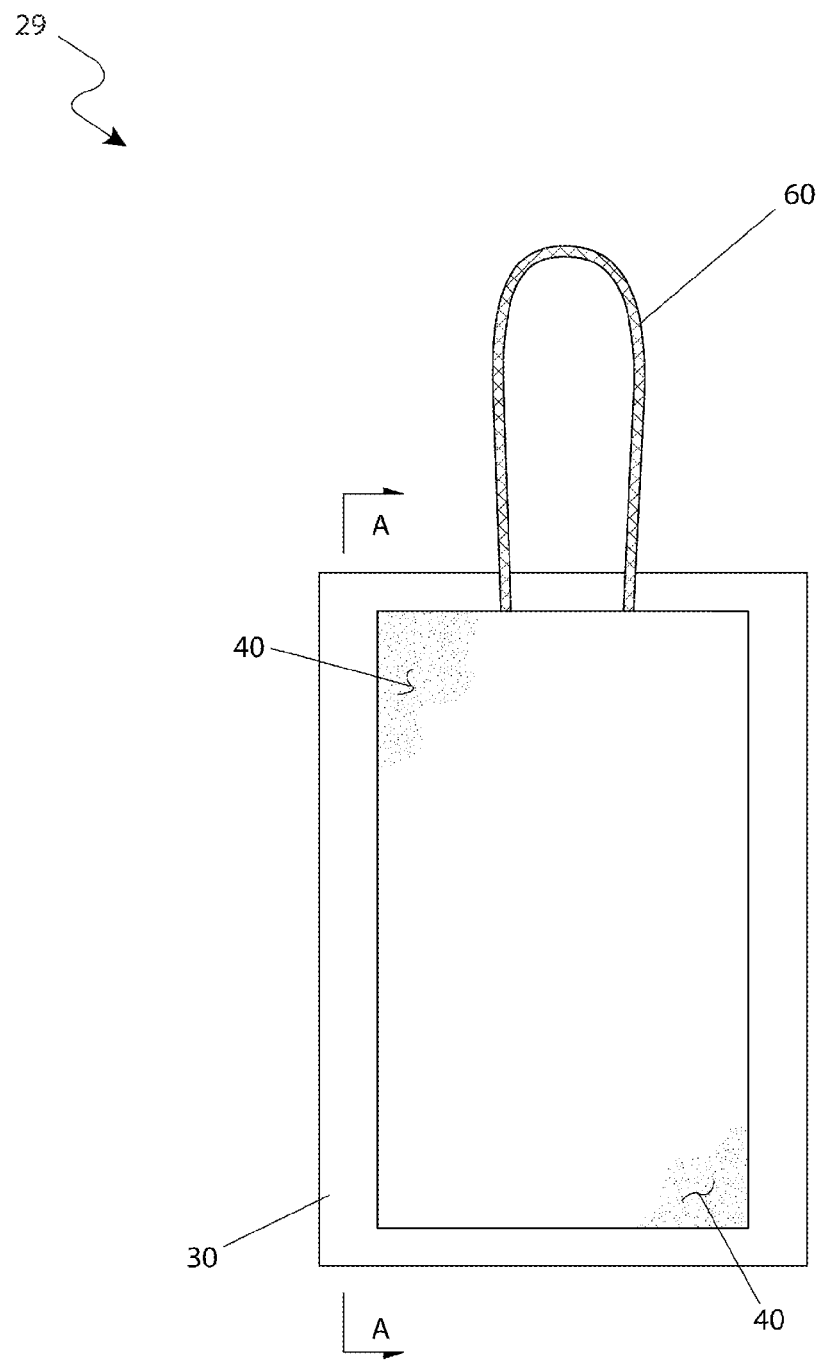
FIG. 4 is a top view of a substrate assembly portion 29 of the insect capturing apparatus 10, according to a preferred embodiment of the present invention.
Figure 5:
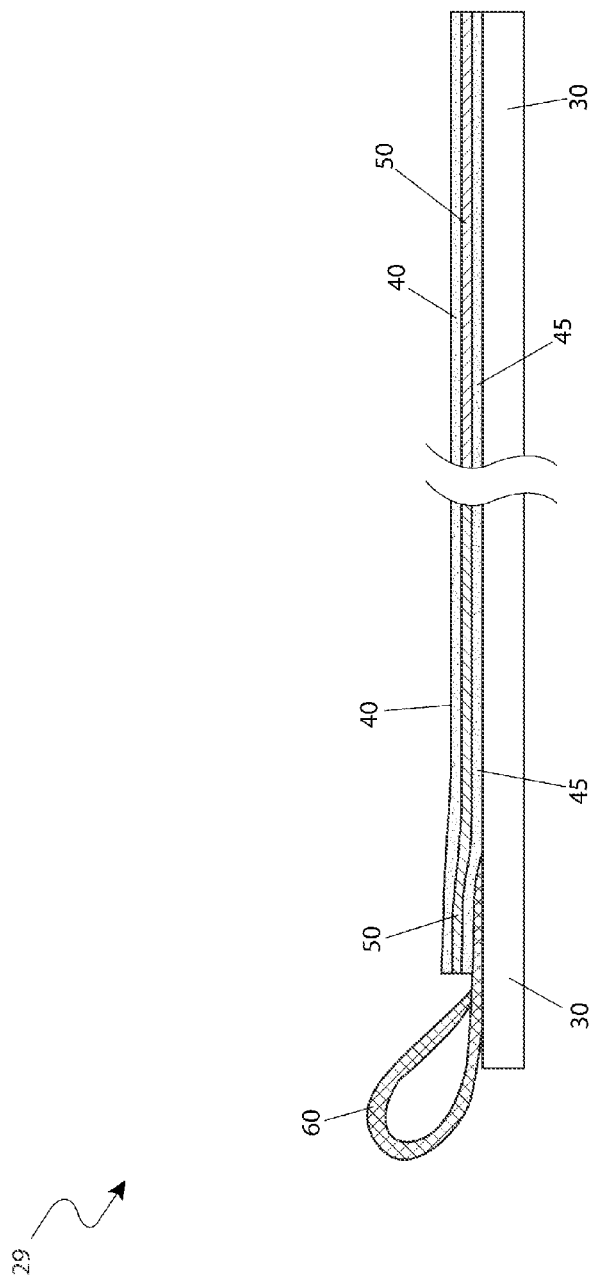
FIG. 5 is a cross-sectional view of the insect substrate assembly portion 29 of the insect capturing apparatus 10 taken along section line A-A (see FIG. 4), according to a preferred embodiment of the present invention; and, FIG. 6 is a perspective view of a refill box portion 120, according to a preferred embodiment of the present invention

Referring now to FIGS. 4 and 5, a top view and a section view of the substrate assembly portion 29 of the apparatus 10, according to a preferred embodiment of the present invention, are disclosed. The substrate assembly 29 comprises a base layer 30, a first adhesive layer 40, a second adhesive layer 45, a paper layer 50, and a lanyard 60, thereby providing a replaceable laminated assembly for trapping insects 70. Additional substrate assemblies 29 are envisioned to be packaged within a convenient refill box 120 (see FIG. 6).

The base layer 30 comprises a semi-rigid paper or cardboard lamination being rectangular in shape and being sized so as to be slidingly inserted into the aforementioned substrate slot portions 27 of the side access opening 26. The base layer 30 provides an attachment means thereto the paper layer 50 via application of a second adhesive layer 45 located between said base 30 and paper 50 layers. The lanyard 60 is to be captivated between the base layer 30 and the paper layer 50, also being secured by said second adhesive layer 45, thereby allowing the substrate assembly 29 to be manually removed in a sanitarily manner from the side access opening 26. A looped section of the lanyard 60 extends outwardly from said substrate assembly 29 through the side opening 26, thereby providing the user with a grasping means to enable extraction of the substrate assembly 29 from the substrate slot portion 27 of the housing 20. The lanyard 60 allows a user to avoid contact with the exterminated insects 70 as well as avoiding contact with the adhesive layers 40, 45. The lanyard 60 is envisioned to be fabricated from materials such as, but not limited to: braided nylon cord, cotton cord, plastic strapping, plastic tubing, or the like. The paper layer 50 comprises a thin layer of common uncoated paper comprising a first adhesive layer 40 envisioned to be sprayed or printed upon said paper layer 50. The paper layer 50 comprises a slightly indented perimeter edge with regards to the subjacent base layer 30, thereby allowing the substrate assembly 29 to freely slide into the substrate slots 27 while providing a maximum upward facing area onto which insects 70 may be captured. The first adhesive layer 40 is envisioned to provide similar function as conventional flypaper and is envisioned to be an extremely tacky substance to restrain insects that may land or crawl on a top surface. Said first adhesive layer 40 is envisioned to comprise a synthetic or food-based tacky surface being similar to coatings used on conventional fly paper and related products. It is further envisioned that an effectiveness of said first adhesive layer 40 may be further embellished using various alluring scents, various insecticides, and other ingredients which improve insect 70 capturing.

Figure 6:
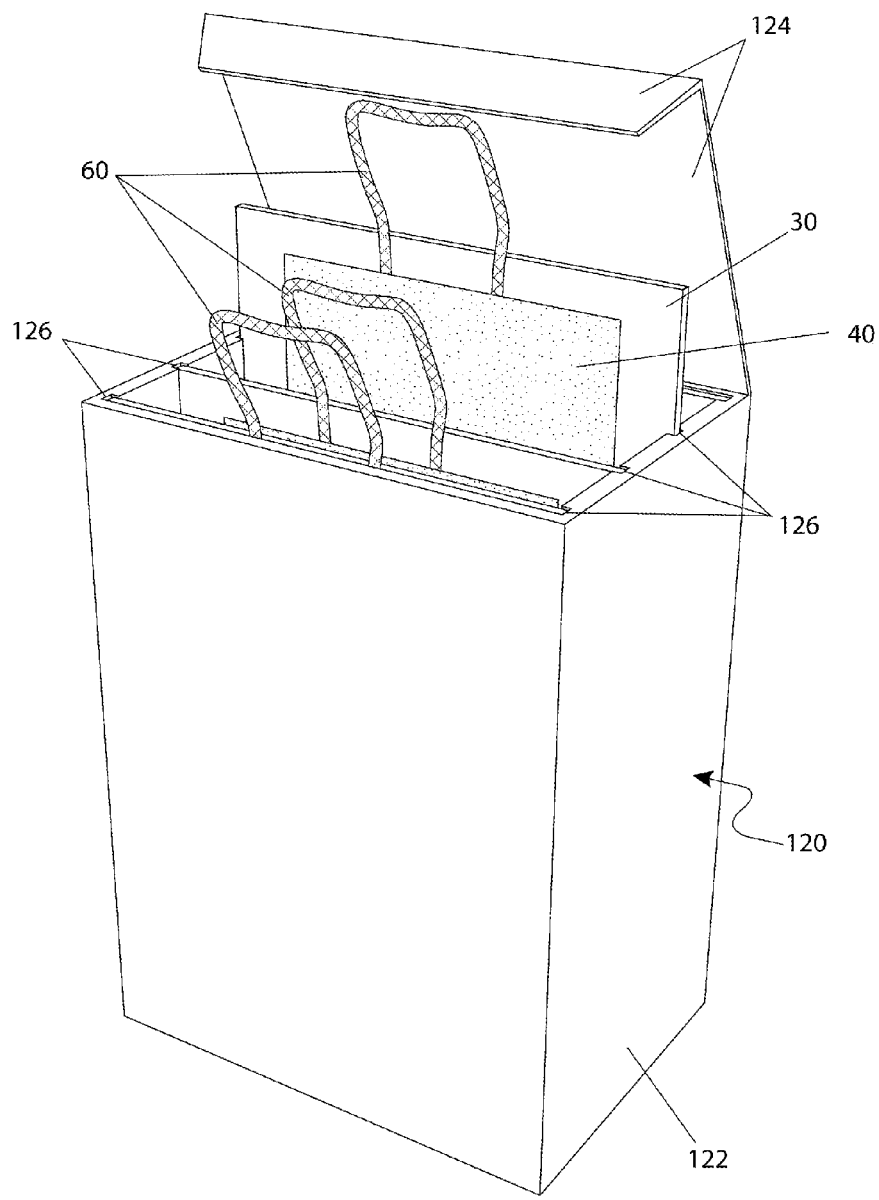

Referring now to FIG. 6, a perspective view of a refill box portion 120, according to a preferred embodiment of the present invention, is disclosed. The refill box 120 is depicted here comprising a box body 122, a box lid 124, and a plurality of box slots 126. Said refill box 120 provides a packaging and storage means to a plurality of replacement substrate assemblies 29 within. Said substrate assemblies 29 are to be insertingly loaded and unloaded vertically into respective parallel box slots 126 in a similar manner as the aforementioned substrate slot portions 27 of the housing 20. The box body 122 and lid 124 portions of the refill box 120 are envisioned to be made of common paper or cardboard materials used in the packaging industry to form a conventional rectangular container. Said refill box 120 may be introduced having various width and depth dimensions to provide containment of varying sizes and quantities of substrate assemblies 29 within.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed and utilized as indicated in FIGS. 1 through 3.

The method of utilizing the apparatus 10 may be achieved by performing the following steps: procuring an apparatus 10 having a desired size; locating a desired area to place said apparatus 10 such as a furniture surface 100 or upon a wall surface 110 using the fastening devices 28; inserting a substrate assembly 29 into the substrate slot portions 27 along the side access opening 26; utilizing the tacky function of the first adhesive layer 40 to capture flying or crawling insects 70 for a period of time; observing the apparatus 10 occasionally until the apparatus 10 has reached a maximum capacity of trapped insects 70; removing the spent substrate assembly 29 by grasping and pulling the lanyard 60 outwardly from the housing portion 20; disposing of the spent substrate assembly 29 in a normal manner; installing a new substrate assembly 29 by removing a new substrate assembly 29 from the refill box 120 and inserting into the slot 27; and, enjoying an aesthetically pleasing and sanitary method of capturing insects 70 using the present invention 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A pest trapping device for entrapping at least one pest, comprising:

a housing portion, further comprising a four-sided frame having an upper opening, a side opening, a side wall opposite said side opening, a pair of opposing walls, and a lower portion;

wherein said side opening further comprises a pair of parallel slots located on and longitudinally extending along said pair of opposing walls opposite of said upper opening;

a base attached to said housing portion; and, an adhesive substrate assembly removably positioned within said housing portion;

wherein said adhesive substrate assembly comprises a generally rectangular shape and further comprises:

a paper layer;

a first adhesive layer bonded to an upper surface of said paper layer;

a base layer having an upper surface bonded to a lower surface of said paper layer with a second adhesive layer; and, a lanyard captivated between the base layer and the paper layer and secured by said second adhesive layer both at a first end of and extending outward from said adhesive substrate assembly;

wherein said first adhesive layer provides an entrapment of said at least one pest thereon; and, wherein said lanyard assists in removal of said adhesive substrate assembly from within said housing portion;

wherein said pair of slots receives said adhesive substrate assembly;

wherein said at least one pest enters said housing portion and is entrapped therein by said adhesive substrate assembly;

wherein said upper opening allows visual inspection of said at least one pest trapped within said housing portion; and, wherein said device provides a concealment of said at least one pest entrapped within said housing portion.

2. The device of claim 1, wherein said base layer further comprises a semi-rigid paper or cardboard lamination.

3. The device of claim 1, wherein said lanyard further comprises a looped member comprising a material of one of the following list: braided nylon cord, cotton cord, plastic strapping, or plastic tubing.

4. The device of claim 1, wherein said paper layer further comprises a slightly indented perimeter edge, thereby allowing said adhesive substrate assembly to freely slide within said pair of slots.

5. The device of claim 1, wherein said first adhesive layer further comprises an additive of at least one of the following list: an alluring scent, or an insecticide.

6. The device of claim 1, wherein said housing portion further comprises a generally rectangular structure with a housing perimeter having dimensions of approximately two (2) inches in height, two (2) inches in width, and three (3) inches in length.

7. The device of claim 6, wherein said base further comprises:
   a front surface having an attachment means for attaching said base to said lower portion of said housing portion, thereby providing a lower wall to said housing portion; and,
   a rear surface having a plurality of mounting means;
   wherein said plurality of mounting means mounts said device to a support structure such that said side opening is accessible to said at least one pest and said upper opening is concealed.

8. The device of claim 7, wherein said base further comprises a generally rectangular body having a base perimeter outwardly extending approximately one inch from said housing perimeter.

9. A pest trapping device for entrapping at least one pest, comprising:
   a housing portion, further comprising a four-sided frame having an upper opening, a side opening, a side wall opposite said side opening, a pair of opposing walls, and a lower portion;
   wherein said side opening further comprises a pair of parallel housing slots located on and longitudinally extending along a pair of opposing walls opposite of said upper opening;
   a base attached to said housing portion; and,
   a packaging means for removably storing a plurality of adhesive substrate assemblies therein, further comprising a box with an open top, an interior having a plurality of parallel packaging slots along opposing side walls, each associated pair of said packaging slots removably receive an individual adhesive substrate assembly of said plurality of adhesive substrate assemblies therein, and a lid covering said open top for providing access to said interior; and,
   wherein said individual adhesive substrate assembly comprises a generally rectangular shape and further comprises:
      a paper layer;
      a first adhesive layer bonded to an upper surface of said paper layer;
      a base layer having an upper surface bonded to a lower surface of said paper layer with a second adhesive layer; and,
      a lanyard captivated between the base layer and the paper layer and secured by said second adhesive layer both at a first end of and extending outward from said individual adhesive substrate assembly;
   wherein said first adhesive layer provides an entrapment of said at least one pest thereon; and,
   wherein said lanyard assists in removal of said individual adhesive substrate assembly from within said housing portion;
   wherein said pair of housing slots receives said individual adhesive substrate assembly;
   wherein said individual adhesive substrate assembly is removably positioned within said housing portion;
   wherein said pair of housing slots receives said individual adhesive substrate assembly;
   wherein said at least one pest enters said housing and is entrapped therein by said individual adhesive substrate assembly;
   wherein said upper opening allows visual inspection of said at least one pest trapped within said housing portion; and,
   wherein said device provides concealment of said at least one pest entrapped within said housing portion.

10. The device of claim 9, wherein said base layer further comprises a semi-rigid paper or cardboard lamination.

11. The device of claim 9, wherein said lanyard further comprises a looped member comprising a material of one of the following list: braided nylon cord, cotton cord, plastic strapping, or plastic tubing.

12. The device of claim 9, wherein said paper layer further comprises a slightly indented perimeter edge, thereby allowing said individual adhesive substrate assembly to freely slide within said pair of housing slots and said each associated pair of said packaging slots.

13. The device of claim 9, wherein said first adhesive layer further comprises an additive of at least one of the following list: an alluring scent, or an insecticide.

14. The device of claim 9, wherein said housing portion further comprises a generally rectangular structure with a housing perimeter having dimensions of approximately two (2) inches in height, two (2) inches in width, and three (3) inches in length.

15. The device of claim 14, wherein said base further comprises:
   a front surface having an attachment means for attaching said base to said lower portion of said housing portion, thereby providing a lower wall to said housing portion; and,
   a rear surface having a plurality of mounting means;
   wherein said plurality of mounting means mounts said device to a support structure such that said side opening is accessible to said at least one pest and said upper opening is concealed.

16. The device of claim 15, wherein said base further comprises a generally rectangular body having a base perimeter outwardly extending approximately one inch from said housing perimeter.

* * * * *